United States Patent
Choi et al.

(10) Patent No.: US 8,964,624 B2
(45) Date of Patent: Feb. 24, 2015

(54) APPARATUS AND METHOD FOR BUFFERING PACKETS IN A MULTI-HOP RELAY SYSTEM SUPPORTING HOP-BY-HOP RETRANSMISSION

(75) Inventors: Jin-Ghoo Choi, Seoul (KR); Chi-Hyun Park, Soowon-si (KR); Sung-Soo Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1814 days.

(21) Appl. No.: 11/854,637

(22) Filed: Sep. 13, 2007

(65) Prior Publication Data

US 2008/0062911 A1 Mar. 13, 2008

(30) Foreign Application Priority Data

Sep. 13, 2006 (KR) .................. 10-2006-0088458

(51) Int. Cl.
  *H04B 7/14* (2006.01)
  *H04B 7/155* (2006.01)
  *H04W 36/02* (2009.01)

(52) U.S. Cl.
  CPC ............... *H04B 7/155* (2013.01); *H04W 36/02* (2013.01)
  USPC ................................ 370/315; 370/428; 455/7

(58) Field of Classification Search
  None
  See application file for complete search history.

(56) References Cited

U.S. PATENT DOCUMENTS

| 6,728,918 | B1* | 4/2004 | Ikeda et al. .................. 714/748 |
| 2004/0192204 | A1* | 9/2004 | Periyalwar et al. ............. 455/25 |
| 2006/0145815 | A1* | 7/2006 | Lanzieri et al. .............. 340/10.2 |
| 2007/0190933 | A1* | 8/2007 | Zheng et al. ..................... 455/7 |
| 2009/0003378 | A1* | 1/2009 | Sachs ............................ 370/466 |

FOREIGN PATENT DOCUMENTS

| JP | 2003-069617 A | 3/2003 |
| JP | 2006-086939 A | 3/2006 |
| KR | 10-2004-0056584 A | 7/2004 |
| KR | 10-2005-0067339 A | 7/2005 |

* cited by examiner

*Primary Examiner* — Mohammad Adhami
(74) *Attorney, Agent, or Firm* — Jefferson IP Law, LLP

(57) ABSTRACT

A packet buffering apparatus and method in a multi-hop relay system supporting hop-by-hop retransmission are provided. In the buffering apparatus and method, a first buffer buffers a user packet until the user packet is successfully transmitted to a next node, and a second buffer buffers the user packet until the user packet is successfully transmitted to an MS, after the user packet is successfully transmitted to the next node. Accordingly, time delays and transmission costs are reduced.

12 Claims, 10 Drawing Sheets

APPARATUS AND METHOD FOR BUFFERING PACKETS IN A MULTI-HOP RELAY SYSTEM SUPPORTING HOP-BY-HOP RETRANSMISSION

PRIORITY

This application claims the benefit under 35 U.S.C. §119 (a) to an application filed in the Korean Intellectual Property Office on Sep. 13, 2006 and assigned Serial No. 2006-88458, the entire disclosure of which is hereby incorporated by reference.

BACKGROUND OF THE INVENTION

1. Field of the Invention

The present invention relates generally to a multi-hop relay system. More particularly, the present invention relates to an apparatus and method for buffering packets in a multi-hop relay system supporting hop-by-hop retransmission.

2. Description of the Related Art

For the purpose of increasing data rate and expanding cell coverage in a cellular network, techniques for improving the propagation environment of users located at a cell boundary or in a shadowing area by use of relay nodes have been proposed. In the proposed techniques, a Base Station (BS) services users directly under a good channel environment and via an adjacent relay node under a poor channel environment, to thereby achieve an overall improved communication quality.

When packet loss occurs on a radio link in a relay cellular network, the BS or its upper Base Station Controller (BSC) retransmits a lost packet toward a Mobile Station (MS), for packet recovery, as with a legacy cellular network. However, even though a packet is lost between the BS and a relay node, it is the MS that sends a request for packet retransmission to the BS via the relay node after detecting the packet loss and then receives a retransmitted packet via the relay node. As a consequence, a time delay is increased in packet recovery and a radio link is wasted. On the other hand, if the BS or the relay node takes charge of reliable packet transmission to the next node (i.e. a relay node or an MS), the next node detects packet loss on the link, requests retransmission to the upper node, and receives a retransmitted packet, thus saving time in packet recovery and avoiding a waste of the radio link. Herein, the former method is called end-to-end retransmission and the latter method is called hop-by-hop retransmission.

In a handoff procedure of a typical cellular network, an MS determines whether to initiate the handoff procedure based on the channel statuses between the MS and a serving BS and between the MS and neighbor BSs. When determining to start the handoff procedure, the MS requests the serving BS to approve a handoff to a target BS and, in turn, the serving BS requests the target BS to approve the handoff of the MS. The target BS determines whether to approve the handoff request according to its resource status and responds to the MS via the serving BS. If the response is approval, the serving BS transfers a context of the MS, i.e. session information and buffered data, to the target BS and reroutes the data transmission path of the MS to the target BS. Thus, the handoff of the MS is completed.

The above handoff procedure is also applicable to the relay cellular network except that when a handoff occurs to an MS served by a relay node, communications are not conducted between a serving BS and the MS not via a direct link but via the relay node. Also, packets buffered in the relay node as well as packets buffered in the serving BS should be transferred to a target BS before a context transfer.

As illustrated in FIG. 1, when a serving relay node 103 services an MS 101 in a relay network supporting hop-by-hop retransmission, some packets are buffered in a serving BS 105, while other packets are buffered in the serving relay node 103. When the MS 101 starts a handoff, the packets buffered in both the serving BS 105 and the serving relay node 103 should be transferred to a target BS 107 before a context transfer. The packet transfer takes place in three steps. In step (1), the serving relay node 103 transfers packets buffered in a relay buffer 130 to the serving BS 105. Then, the serving BS 105 transfers the received buffered packets to a target BS buffer 170 of the target BS 107 in step (2). In step (3), the serving BS 105 transfers packets buffered in a serving BS buffer 150 to the target BS buffer 170 of the target BS 107. While steps (2) and (3) cause a short transmission delay and a low transmission cost because the packets are transmitted over wired networks, the packet transfer on a radio link in step (1) results in a long time delay and a high transmission cost. This problem becomes more serious when a plurality of relay nodes are involved in servicing the MS.

SUMMARY OF THE INVENTION

An aspect of the present invention is to address at least the above mentioned problems and/or disadvantages and to provide at least the advantages described below. Accordingly, an aspect of the present invention is to provide an apparatus and method for buffering packets in a multi-hop relay system supporting hop-by-hop retransmission.

Another aspect of the present invention is to provide an apparatus and method for supporting fast handoff by preserving packets transmitted to a serving relay node in a serving BS and, when a user serviced by the serving relay node performs a handoff to a neighbor cell, transferring the preserved packets from the serving BS directly to a target BS, thus having the effect that the serving BS transfers even the packets buffered in the serving relay node to the target BS in a multi-hop relay system supporting hop-by-hop retransmission.

According to an aspect of the present invention, a packet buffering apparatus of a node in a multi-hop relay system is provided. In the packet buffering apparatus, a first buffer buffers a user packet until the user packet is successfully transmitted to a next node, and a second buffer buffers the user packet until the user packet is successfully transmitted to an MS, after the user packet is successfully transmitted to the next node.

According to another aspect of the present invention, a packet buffering method of a node in a multi-hop relay system is provided. In the packet buffering method, a user packet is buffered in a first buffer after the user packet is transmitted to a next node, and when the user packet is successfully transmitted to the next node, the user packet is deleted from the first buffer and buffered in a second buffer until the user packet is successfully transmitted to an MS.

According to a further aspect of the present invention, a handoff method of a BS in a multi-hop relay system is provided. In the handoff method, the BS buffers a packet directed to an MS in a first buffer until the packet is successfully transmitted to a relay node, after the packet is transmitted to the relay node, buffers the packet in a second buffer until the packet is successfully transmitted to the MS, if the packet has been successfully transmitted to the relay node, and transmits packets buffered for the MS in the first and second buffers to a target BS, upon receipt of a first handoff accept message for the MS from the target BS.

According to still another aspect of the present invention, a handoff requesting method of an MS in a multi-hop relay system is provided. In the handoff requesting method, the MS measures an average CINR of a signal received from a serving BS and an average CINR of a signal received from a target BS, compares the difference between the average CINRs with a minimum value, transmits a message requesting application of an image buffering scheme to the serving BS, if the difference between the average CINRs is less than the minimum value, and transmits a handoff request message to a target BS via the serving BS.

According to yet another aspect of the present invention, a handoff apparatus in a multi-hop relay system is provided. In the handoff apparatus, an MS measures an average CINR of a signal received from a serving BS and an average CINR of a signal received from a target BS, and transmits a message requesting application of an image buffering scheme to the serving BS, if the difference between the average CINRs is less than a minimum value, and upon receipt of the message requesting application of the image buffering scheme, the serving BS buffers a packet directed to the MS in a first buffer until the packet is successfully transmitted to a relay node, after the packet is transmitted to the relay node and buffers the packet in a second buffer until the packet is successfully transmitted to the MS, if the packet has been successfully transmitted to the relay node.

BRIEF DESCRIPTION OF THE DRAWINGS

The above and other aspects, features and advantages of the present invention will become more apparent from the following detailed description of certain exemplary embodiments when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions or constructions are omitted for clarity and conciseness.

The present invention is intended to provide an apparatus and method for buffering packets in a multi-hop relay system supporting hop-by-hop retransmission. While the following description is made in the context of a single relay node between a BS and an MS, this is merely for sake of convenience and it can be extended to more relay nodes. Herein, an image buffer and a BS buffer in the BS and an image buffer and a relay buffer in the relay node are logically distinguished. Therefore, they can be configured in one physical buffer by dividing the physical buffer into two parts, or as different physical buffers.

Figure 1:
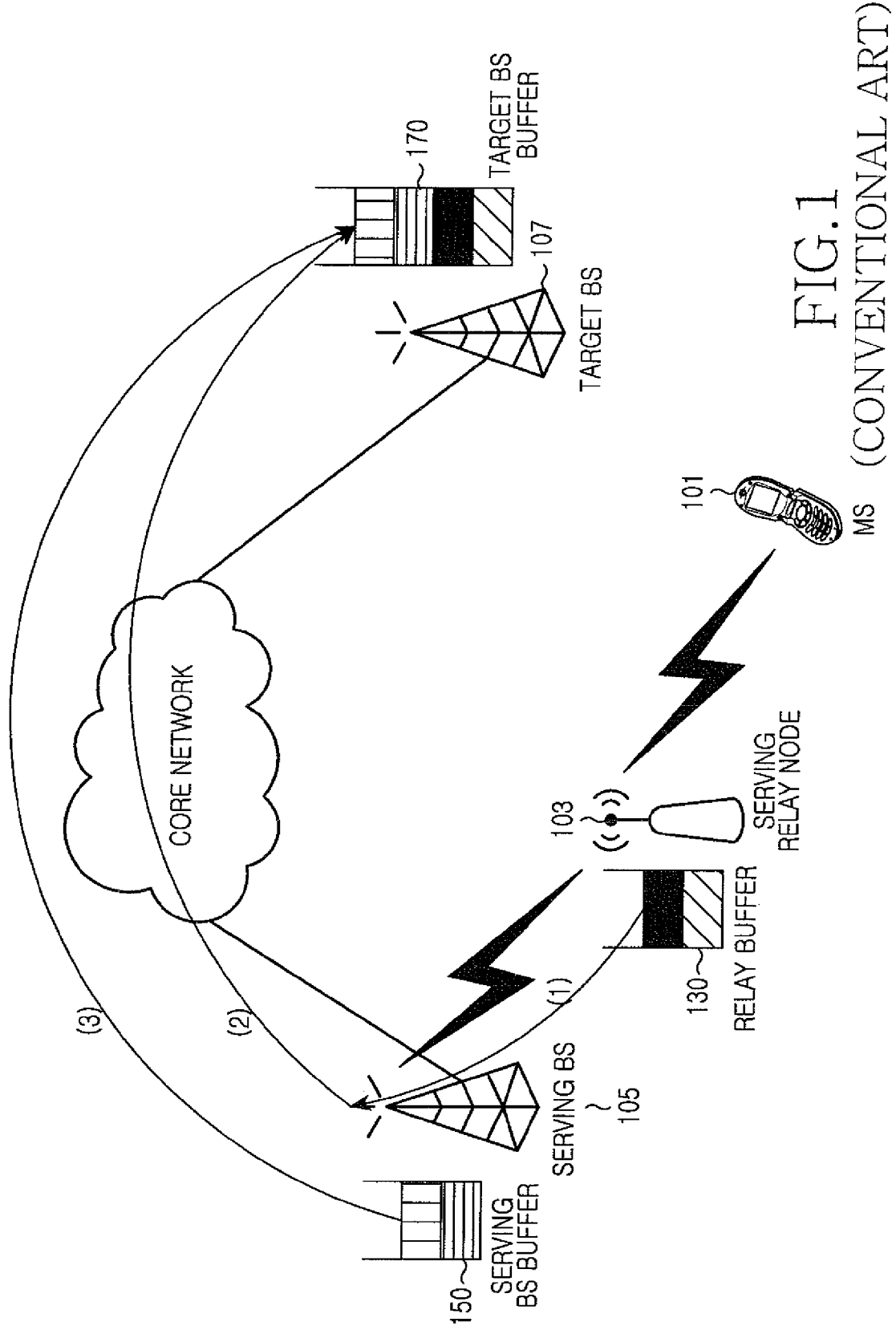
FIG. 1 illustrates a packet transfer during handoff in a conventional multi-hop relay system.
Figure 2:
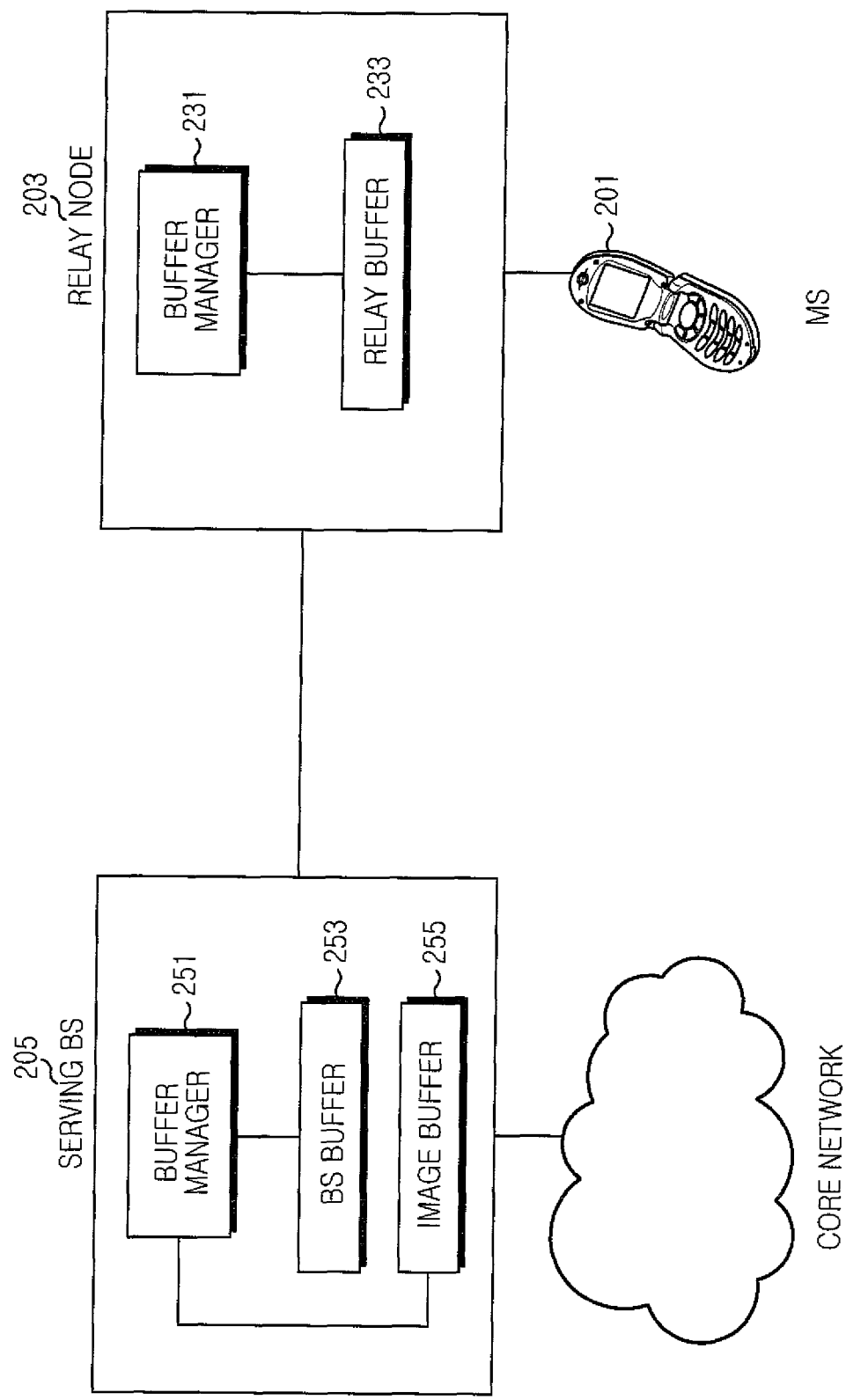
FIG. 2 is a block diagram of a packet buffering apparatus in a multi-hop relay system supporting hop-by-hop retransmission according to an exemplary embodiment of the present invention.

FIG. 2 is a block diagram of a packet buffering apparatus in a multi-hop relay system supporting hop-by-hop retransmission according to an exemplary embodiment of the present invention. The multi-hop relay system includes an MS 201, a relay node 203, and a BS 205. The relay node 203 includes a buffer manager 231 and a relay buffer 233. The BS 205 includes a buffer manager 251, a BS buffer 253, and an image buffer 255.

Referring to FIG. 2, in the relay node 203, the buffer manager 231 manages the relay buffer 233 and buffers packets received from the BS 205 in the relay buffer 233 until the packets are successfully transmitted to the MS 201.

In the BS 205, the buffer manager 251 manages the BS buffer 253 and the image buffer 255 and buffers user packets in the BS buffer 253 until they are successfully transmitted to the relay node 203. If the packets are successfully transmitted to the relay node 203, the buffer manager 251 buffers the packets in the image buffer 255 without immediately deleting them. When the MS 201 successfully receives the packets, the packets are deleted from the image buffer 255. Thus, the BS 205 keeps copies of packets buffered in the relay node 203.

The BS buffer 253 and the relay buffer 233 include memories that store user packets until they are successfully transmitted to the next nodes. The image buffer 255 includes an additional memory for enabling an efficient packet transfer to a target BS during a handoff.

Figure 3:
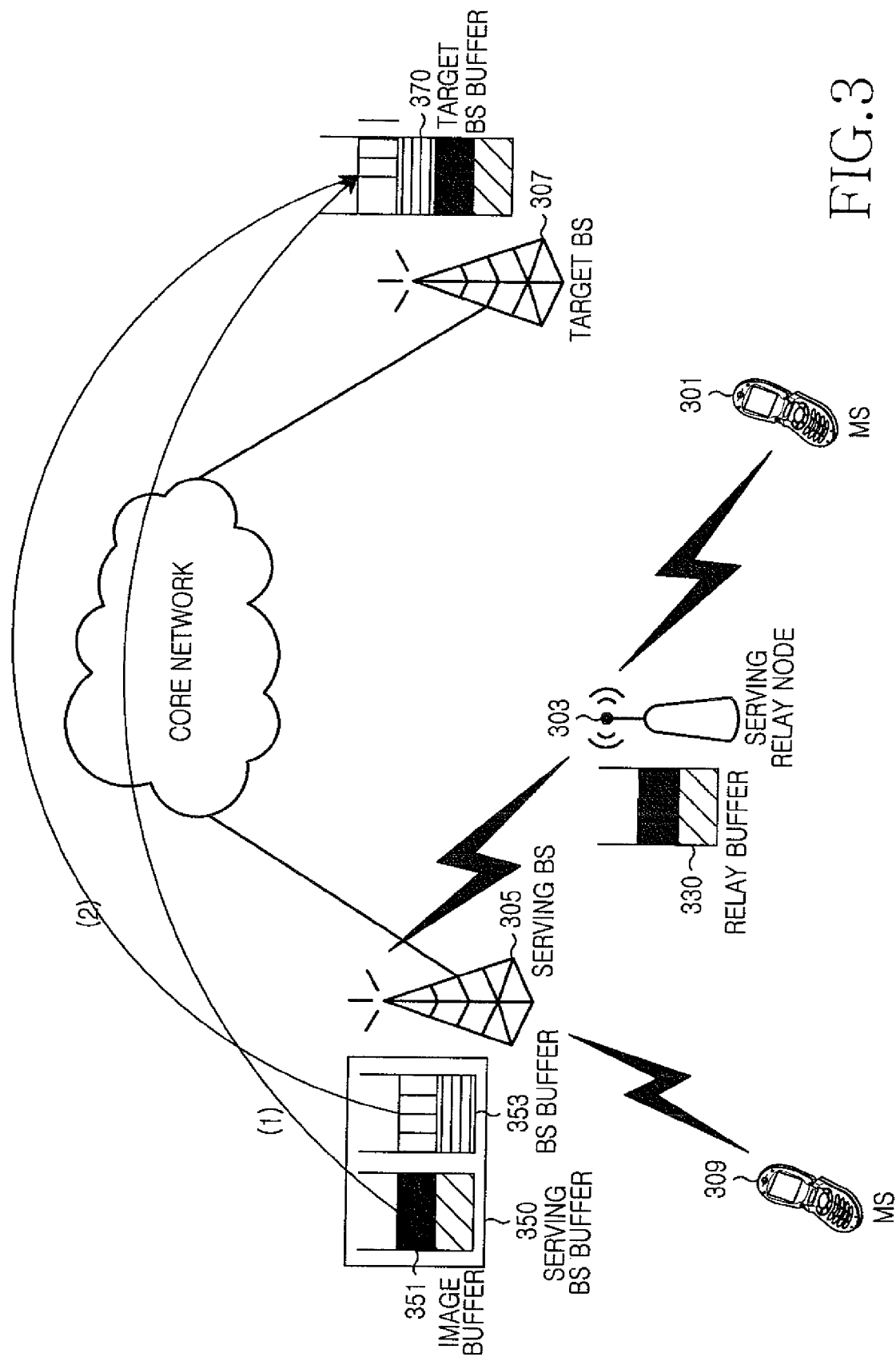
FIG. 3 illustrates a packet transfer during handoff in a multi-hop relay system supporting hop-by-hop retransmission according to an exemplary embodiment of the present invention.

FIG. 3 illustrates a packet transfer during handoff in a multi-hop relay system supporting hop-by-hop retransmission according to an exemplary embodiment of the present invention.

Referring to FIG. 3, when an MS 301 serviced by a serving relay node 303 performs a handoff, a serving BS 305 transfers packets for the MS 301 buffered in an image buffer 351 of a serving BS buffer 350 to a target BS buffer 370 of a target BS 307 in step (1) and transfers packets for the MS 301 buffered in a BS buffer 353 of the serving BS buffer 350 to the target BS buffer 370 in step (2). Since the serving relay node 303 does not need to transfer packets buffered in a relay buffer 330 to the serving BS 305 on a radio link, the time delay of the packet transfer is decreased and a waste of the radio link is avoided. If an MS 309 serviced directly by the serving BS 305 performs a handoff, the serving BS 305 may transfer packets in the method illustrated in FIG. 4.

Figure 4:
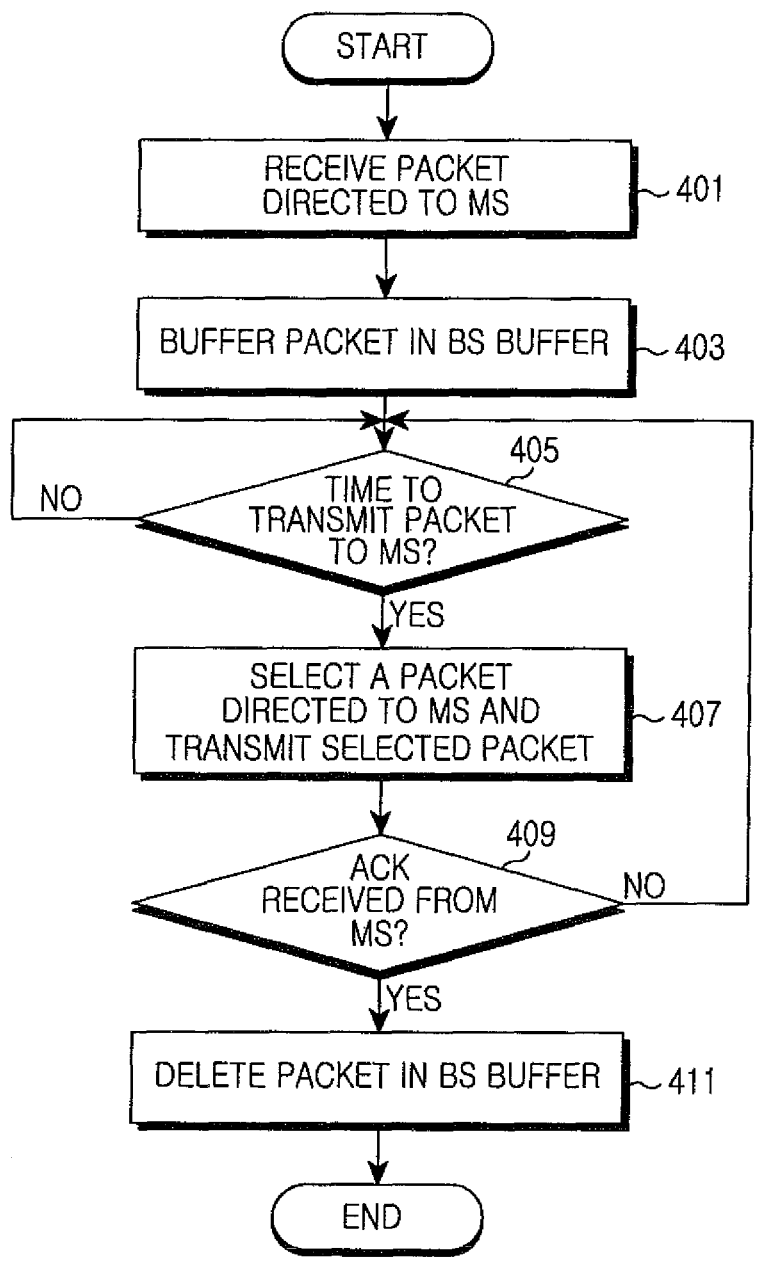
FIG. 4 is a flowchart illustrating a packet buffering method for supporting fast handoff in a serving BS, when the serving BS is an access point of an MS in a multi-hop relay system supporting hop-by-hop retransmission according to an exemplary embodiment of the present invention.

FIG. 4 is a flowchart illustrating a packet buffering method for supporting fast handoff in a serving BS, when the serving BS is an access point of an MS in a multi-hop relay system supporting hop-by-hop retransmission according to an exemplary embodiment of the present invention.

Referring to FIG. 4, a serving BS receives a packet directed to an MS from an upper core network or another MS within the same cell in step 401, buffers the packet in a BS buffer in step 403, and determines whether it is time to transmit a packet to the MS in step 405.

If it is time to transmit a packet to the MS, the serving BS selects a packet of the MS buffered in the BS buffer and transmits it to the MS in step 407. In step 409, the serving BS monitors reception of an ACKnowledgement (ACK) signal from the MS. The MS can notify the serving BS of successful reception of the packet by the ACK signal or of failed reception of the packet by a Negative ACK (NACK) signal.

Upon receipt of the ACK signal from the MS, the serving BS deletes the packet from the BS buffer in step 411. On the other hand, upon receipt of the NACK signal from the MS, the serving BS keeps the buffered packet and returns to step 405 to retransmit the packet at the next transmission time.

Then the serving BS ends the algorithm of the exemplary embodiment.

Figure 5:
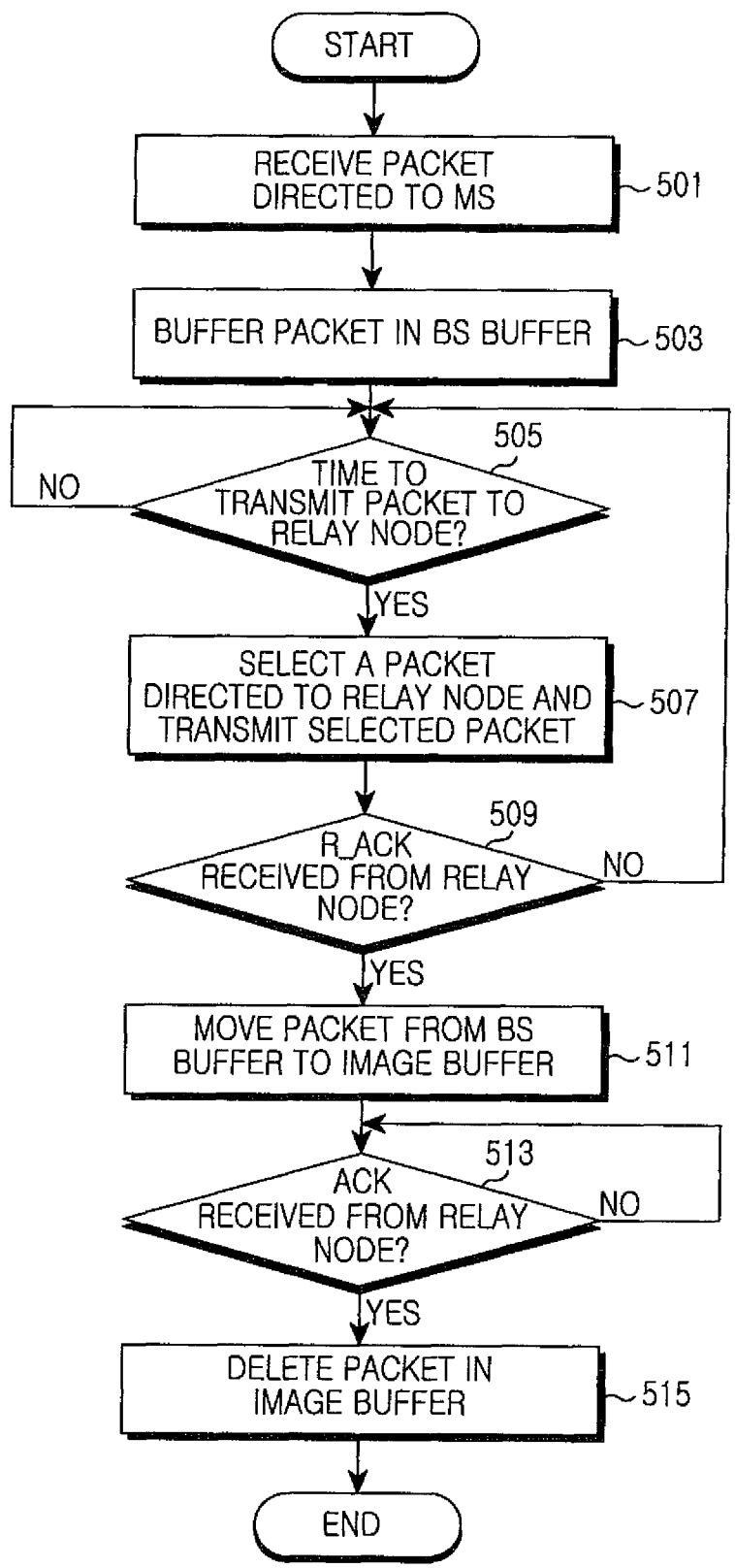
FIG. 5 is a flowchart illustrating a packet buffering method for supporting fast handoff in a serving BS, when a serving relay node is an access point of an MS in a multi-hop relay system supporting hop-by-hop retransmission according to an exemplary embodiment of the present invention.

FIG. 5 is a flowchart illustrating a packet buffering method for supporting fast handoff in a serving BS, when a serving relay node is the access point of an MS in the multi-hop relay system supporting hop-by-hop retransmission according to an exemplary embodiment of the present invention.

Referring to FIG. 5, a serving BS receives a packet directed to an MS from the upper core network or another MS within the same cell in step 501, buffers the packet in a BS buffer in step 503, and determines whether it is time to transmit a packet to a serving relay node of the MS in step 505.

If it is time to transmit a packet to the serving relay node, the serving BS selects a packet of the serving relay node buffered in the BS buffer and transmits it to the serving relay node in step 507. In step 509, the serving BS monitors reception of a Relay ACKnowledgement (R_ACK) signal from the serving relay node. The serving relay node can notify the serving BS of successful reception of the packet by the R_ACK signal or of failed reception of the packet by a Relay Negative ACK (R_NACK) signal.

Upon receipt of the R_NACK signal from the serving relay node, the serving BS keeps the buffered packet and returns to step 505 to retransmit the packet at the next transmission time.

On the other hand, upon receipt of the R_ACK signal from the serving relay node, the serving BS transfers the packet from the BS buffer to an image buffer in step 511 and then monitors reception of an R_ACK signal from the serving relay node in step 513. The reception of the R_ACK signal means successful reception of the packet at the serving relay node at the next hop, not at the MS. Therefore, the serving BS moves the packet to the image buffer instead of deleting it.

Upon receipt of an ACK signal for the packet from the serving relay node, the serving BS deletes the packet from the image buffer in step 515 and then ends the algorithm of the exemplary embodiment.

Figure 6:
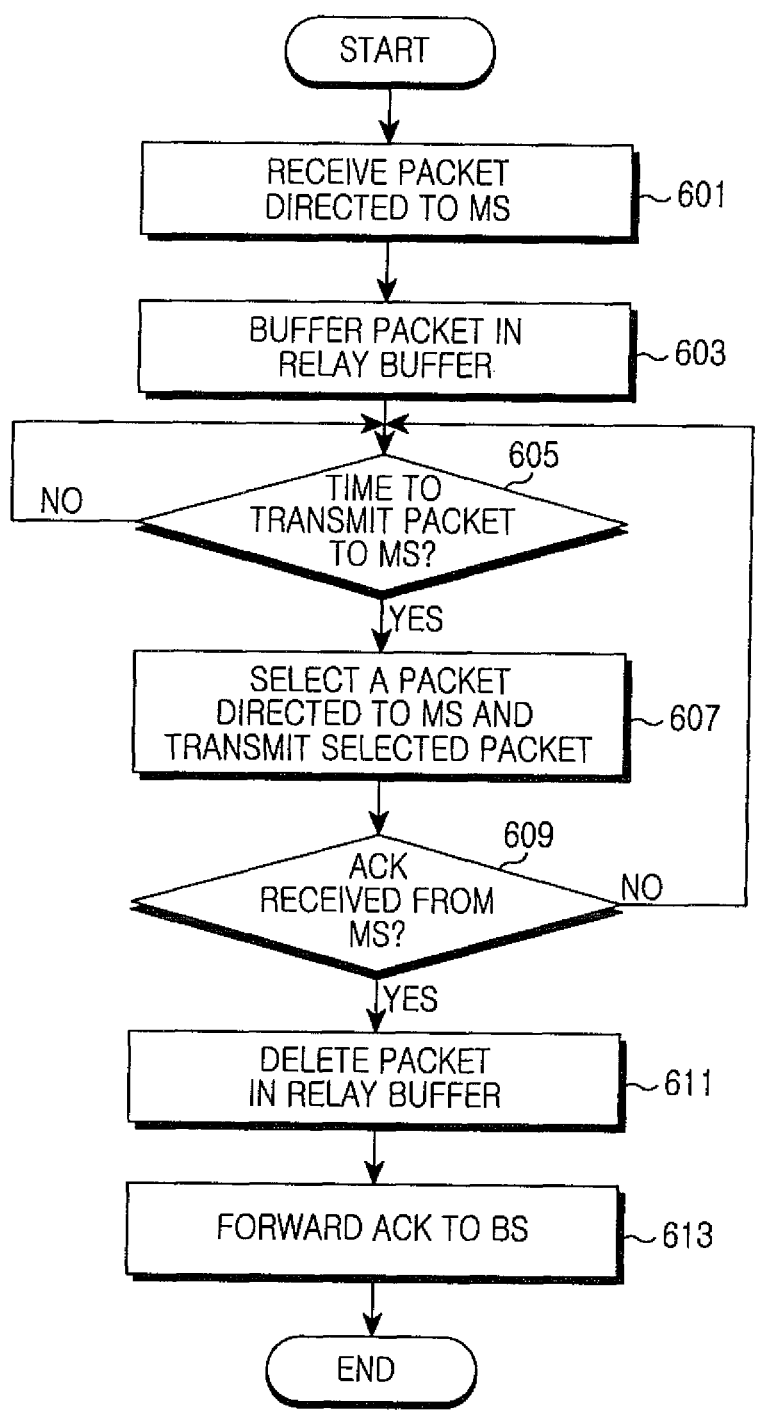
FIG. 6 is a flowchart illustrating a packet buffering method for supporting fast handoff in a serving relay node, when the serving relay node is the access point of an MS in a multi-hop relay system supporting hop-by-hop retransmission according to an exemplary embodiment of the present invention.

FIG. 6 is a flowchart illustrating a packet buffering method for supporting fast handoff in a serving relay node, when the serving relay node is the access point of an MS in a multi-hop relay system supporting hop-by-hop retransmission according to an exemplary embodiment of the present invention.

Referring to FIG. 6, a serving relay node receives a packet directed to an MS from a serving BS in step 601. The serving relay node transmits an R_ACK/R_NACK signal to the serving BS depending on successful or failed reception of the packet. For a failed packet, the serving relay node may repeat retransmission until the packet is received successfully.

The serving relay node buffers the successfully received packet in the relay buffer in step 603 and determines whether it is time to transmit a packet to the MS in step 605.

If it is time to transmit a packet to the MS, the serving relay node selects a packet of the MS buffered in the relay buffer and transmits it to the MS in step 607. In step 609, the serving relay node monitors reception of an ACK signal from the MS. The MS can notify the serving relay node of successful reception of the packet by the ACK signal or of failed reception of the packet by a NACK signal.

Upon receipt of the NACK signal from the MS, the serving relay node keeps the buffered packet and returns to step 605 to retransmit the packet at the next transmission time.

Upon receipt of the ACK signal from the MS, the serving relay node deletes the packet from the relay buffer in step 611 and forwards the ACK signal to the serving BS in step 613. The serving relay node may simply forward the received ACK signal to the serving BS or generate a new ACK signal using the received ACK signal and transmits it to the serving BS.

Then the serving relay node ends the algorithm of the exemplary embodiment.

Figure 7:
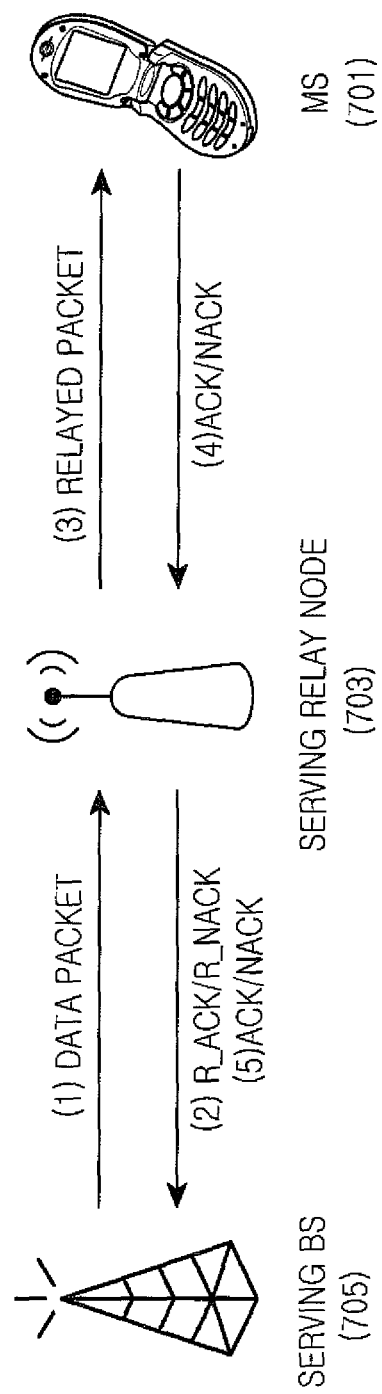
FIG. 7 illustrates a data flow and flows of ACK/NACK and R_ACK/R_NACK signals, when a serving relay node is the access point of an MS in a multi-hop relay system supporting hop-by-hop retransmission according to an exemplary embodiment of the present invention.

FIG. 7 illustrates a data flow and flows of ACK/NACK and R_ACK/R_NACK signals, when a serving relay node is an access point of an MS in a multi-hop relay system supporting hop-by-hop retransmission according to an exemplary embodiment of the present invention.

Referring to FIG. 7, a serving BS 705 transmits a data packet to a serving relay node 703 in step (1). The serving relay node 703 notifies the serving BS 705 of successful or failed reception of the data packet by transmitting an R_ACK/R_NACK signal in step (2). When the serving relay node 703 has received the data packet successfully, it forwards the data packet to an MS 701 in step (3). In step (4), the MS 701 notifies the serving relay node 703 of successful or failed reception of the data packet by transmitting an ACK/NACK signal. The serving relay node 703 forwards the received ACK/NACK signal to the serving BS 705, to thereby notify that the MS 701 has finally received the data packet in step (5).

Figure 8:
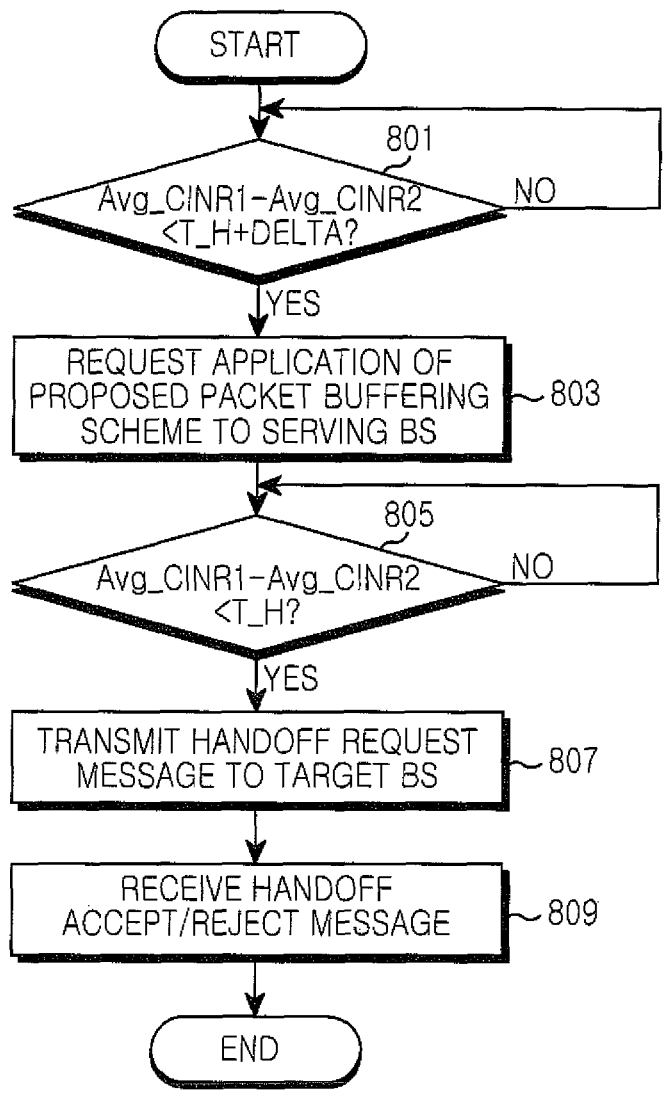
FIG. 8 is a flowchart illustrating a handoff procedure of an MS in a multi-hop relay system supporting hop-by-hop retransmission according to an exemplary embodiment of the present invention.

FIG. 8 is a flowchart illustrating a handoff procedure of an MS in a multi-hop relay system supporting hop-by-hop retransmission according to an exemplary embodiment of the present invention. While it is described that the MS initiates a handoff for illustrative purposes, the BS may also initiate the handoff and various criterions for initiating handoff are available. If the access point of the MS is the serving relay node, messages are transmitted and received between the MS and the serving BS via the serving relay node. If the access point of the MS is the serving BS, messages are transmitted and received directly between the MS and the serving BS.

Referring to FIG. 8, in step 801 the MS measures the average Carrier-to-Interference and Noise Ratios (CINRs) of signals received from the serving BS and a target BS and compares the difference between the average CINRs with the sum of a threshold T_H and δ as described in Equation (1) in order to determine whether a handoff is imminent.

$$\text{Avg\_CINR1} - \text{Avg\_CINR2} < T\_H + \delta \qquad (1)$$

where Avg_CINR1 denotes the average CINR of the serving BS, Avg_CINR2 denotes the average CINR of the target BS, and δ can be set to a value larger than 0 to sense an imminent handoff beforehand.

If the difference between the average CINRs is less than the sum of the threshold T_H and δ, the MS determines that a handoff is imminent and transmits a message requesting packet buffering according to an exemplary embodiment of the present invention to the serving BS in step 803.

In step 805, the MS compares the difference between the average CINRs with the threshold T_H in order to determine whether to initiate the handoff.

$$\text{Avg\_CINR1} - \text{Avg\_CINR2} < T\_H \qquad (2)$$

If the difference between the average CINRs is less than the threshold T_H, the MS transmits a handoff request message to the target BS via the serving BS in step 807. After receiving a handoff accept/reject message from the target BS via the serving BS in step 809, the MS ends the algorithm of the exemplary embodiment present invention.

Figure 9:
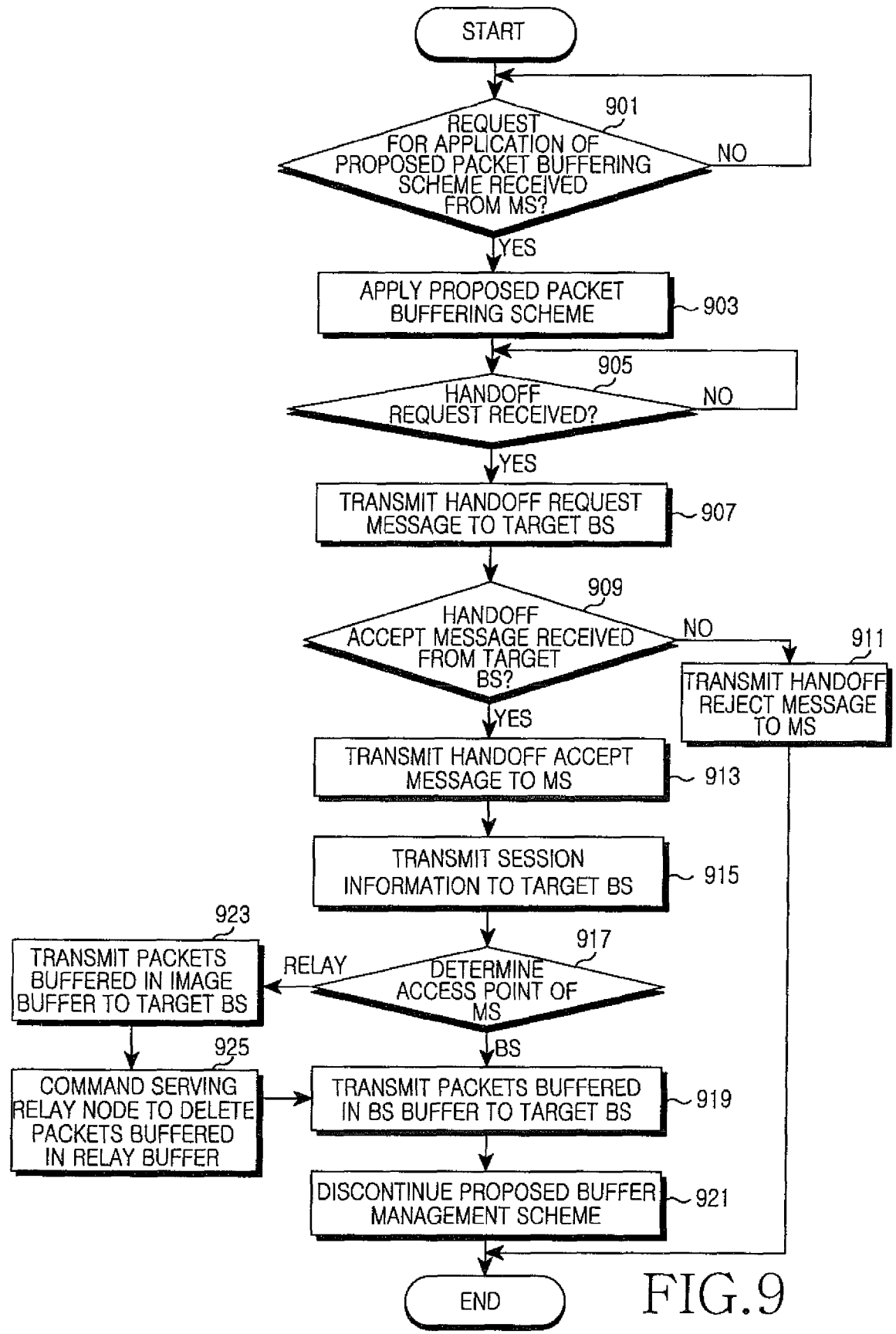
FIG. 9 is a flowchart illustrating a handoff procedure of a serving BS in a multi-hop relay system supporting hop-by-hop retransmission according to an exemplary embodiment of the present invention.

FIG. 9 is a flowchart illustrating a handoff procedure of a serving BS in a multi-hop relay system supporting hop-by-hop retransmission according to an exemplary embodiment of the present invention. If the access point of an MS is the serving relay node, messages are transmitted and received between the MS and the serving BS via the serving relay node. If the access point of the MS is the serving BS, messages are transmitted and received directly between the MS and the serving BS.

Referring to FIG. 9, a serving BS monitors reception of a message requesting packet buffering according to an exemplary embodiment of the present invention from the MS in step 901. Upon receipt of the message, the serving BS uses the image buffering according to an exemplary embodiment of the present invention as a new packet-buffering scheme in step 903. That is, in response to the message requesting the packet buffering according to an exemplary embodiment of the present invention, the serving BS keeps a packet transmitted to the serving relay node in the image buffer rather than deletes it in the BS buffer, and deletes it in the image buffer when the serving BS confirms that it has been transmitted completely to the MS.

In step 905, the serving BS monitors reception of a handoff request message from the MS. Upon receipt of the handoff request message, the serving BS transmits a handoff request message to the target BS in step 907. The serving BS may simply forward the handoff request message received from the MS to the target BS or it may generate a new handoff request message using the received handoff request message and transmit it to the target BS.

In step 909, the serving BS monitors reception of a handoff accept message from the target BS. Upon receipt of a handoff reject message from the target BS, the serving BS transmits a handoff reject message to the MS in step 911 and ends the algorithm of the exemplary embodiment.

On the contrary, upon receipt of the handoff accept message from the target BS, the serving BS transmits a handoff accept message to the MS in step 913 and transmits session information about the MS to the target BS in step 915. The serving BS may simply forward the handoff accept/reject message received from the target BS to the MS, or it may generate a new handoff accept/reject message using the received handoff accept/reject message and transmit it to the MS.

In step 917, the serving BS determines whether the access point of the MS is the serving BS or the serving relay node. If the access point is the serving relay node, the serving BS transmits packets for the MS buffered in the image buffer to the target BS in step 923, commands the serving relay node to delete packets directed to the MS from the relay buffer in step 925, and transmits packets for the MS buffered in the BS buffer to the target BS in step 919. The serving relay node deletes the packets for the MS from the relay buffer as commanded.

If it is determined in step 917 that the access point is the serving BS, the serving BS transmits the packets for the MS buffered in the BS buffer to the target BS in step 919.

In step 921, the serving BS discontinues applying the buffer management scheme of an exemplary embodiment the present invention and establishes a data transmission path of the MS to the target BS. Then the serving BS ends the algorithm.

Meanwhile, one or more other relay nodes may exist between the BS 205 and the relay node 203 in FIG. 2. In this case, each of the other relay nodes may be configured as illustrated in FIG. 10.

Figure 10:
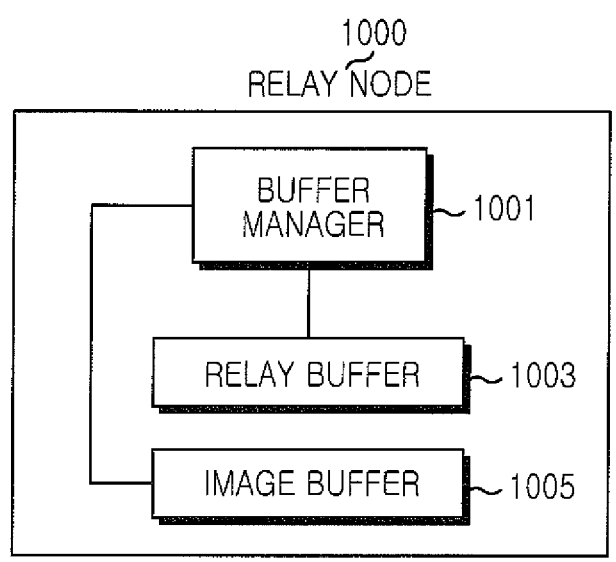
FIG. 10 is a block diagram of a relay node, when a plurality of relay nodes exist in a multi-hop relay system supporting hop-by-hop retransmission according to an exemplary embodiment of the present invention.

FIG. 10 is a block diagram of a relay node, when a plurality of relay nodes exist in a multi-hop relay system supporting hop-by-hop retransmission according to an exemplary embodiment of the present invention. A relay node 1000 includes a buffer manager 1001, a relay buffer 1003, and an image buffer 1005.

Referring to FIG. 10, the buffer manager 1001 manages the relay buffer 1003 and the image buffer 1005. It buffers a packet received from a previous node in the relay buffer 1003 until the packet is successfully transmitted to the next node. When the packet is successfully transmitted to the next node, the buffer manager 1001 keeps the packet in the image buffer 1005 instead of immediately deleting the packet. If an MS successfully receives the packet, the buffer manager 1001 deletes the packet in the image buffer. The previous node can be a BS or another relay node.

The relay buffer 1003 includes a memory that stores packets received from the previous node until they are successfully transmitted to the next node. The image buffer 1005 includes a memory that stores a packet successfully transmitted to the next relay node until an MS successfully receives the packet.

The ACK/NACK signal and the R_ACK/R_NACK signal need not be transmitted in every packet. They can be transmitted periodically or every predetermined number of packets.

In accordance with an exemplary embodiment of the present invention as described above, a serving BS preserves packets transmitted to a serving relay node in a multi-hop relay system supporting hop-by-hop retransmission. When an MS serviced by the serving relay node performs a handoff to a neighbor cell, the serving BS transfers the preserved packets directly to a target BS, thus having the effect that the serving BS transfers even the packets buffered in the serving relay node to the target BS. Therefore, a transmission delay involved in transferring packets for the MS to the target BS is decreased and radio resources are saved between the serving relay node and the serving BS. As a consequence, a fast handoff is supported.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A packet buffering apparatus of a node in a relay system, comprising:
    a first buffer for buffering a user packet until the user packet is successfully transmitted to a next node, wherein the user packet is deleted from the first buffer and is transferred to a second buffer different from the first buffer when an acknowledgment message is received indicating that the user packet has been successfully received by the next node; and
    the second buffer for buffering the transferred user packet until the user packet is successfully transmitted to a Mobile Station (MS) via the next node, after the user packet is successfully transmitted to the next node,
    wherein the transferred user packet is deleted from the second buffer when an acknowledgment message is received indicating that the user packet has been successfully received by the MS.

2. The packet buffering apparatus of claim 1, wherein the node comprises at least one of a Base Station (BS) and a relay node.

3. A packet buffering method of a node in a relay system, the method comprising:
    buffering a user packet in a first buffer until the user packet is successfully transmitted to a next node;
    deleting the user packet from the first buffer and transferring the user packet to a second buffer different from the first buffer when an acknowledgment message is received indicating that the user packet is successfully transmitted to the next node;
    buffering the transferred user packet in the second buffer until the user packet is successfully transmitted to a Mobile Station (MS) via the next node; and
    deleting the transferred user packet from the second buffer when an acknowledgment message is received indicating that the user packet is successfully transmitted to the MS.

4. The packet buffering method of claim 3, wherein the node comprises at least one of a Base Station (BS) and a relay node.

5. A handoff method of a Base Station (BS) in a relay system, the method comprising:
    buffering a user packet in a first buffer until the user packet is successfully transmitted to a next node;
    deleting the user packet from the first buffer and transferring the user packet to a second buffer different from the first buffer when an acknowledgment message is received indicating that the user packet is successfully transmitted to the next node;
    buffering the transferred user packet in the second buffer until the user packet is successfully transmitted to a Mobile Station (MS) via the next node; and
    deleting the transferred user packet from the second buffer when an acknowledgment message is received indicating that the user packet is successfully transmitted to the MS; and
    transmitting packets buffered for the MS in the first and second buffers to a target BS, upon receipt of a first handoff accept message for the MS from the target BS.

6. The handoff method of claim 5, further comprising receiving a message requesting the buffering from the MS before the buffering.

7. The handoff method of claim 5, further comprising:
    transmitting a second handoff request message to the target BS, upon receipt of a first handoff request message from the MS; and
    transmitting at least one of a second handoff accept message and a second handoff reject message to the MS, upon receipt of one of the first handoff accept message and a first handoff reject message from the target BS.

8. The handoff method of claim 7, further comprising transmitting session information about the MS to the target BS after transmitting the at least one of the second handoff accept message and the second handoff reject message, upon receipt of the first handoff accept message from the target BS.

9. The handoff method of claim 5, further comprising transmitting a message commanding deletion of packets buffered for the MS in a buffer of the relay node to the relay node and discontinuing the buffering, after the transmission.

10. The handoff method of claim 5, wherein the first and second buffers comprise at least one of a single physical buffer divided into two parts and two physical buffers.

11. The packet buffering apparatus of claim 1, wherein the user packet buffered for the MS in the first and second buffers is transmitted to a target BS, when the MS initiates a handoff.

12. The packet buffering method of claim 3, wherein the user packet buffered for the MS in the first and second buffers is transmitted to a target BS, when the MS initiates a handoff.

* * * * *